March 4, 1958 — C. S. SCHROEDER — 2,825,771
TIME DELAYED CONTROLLER
Filed Nov. 19, 1953 — 3 Sheets-Sheet 1

INVENTOR
C. S. Schroeder
BY
A. H. Golden
ATTORNEY

March 4, 1958  C. S. SCHROEDER  2,825,771
TIME DELAYED CONTROLLER
Filed Nov. 19, 1953  3 Sheets-Sheet 2
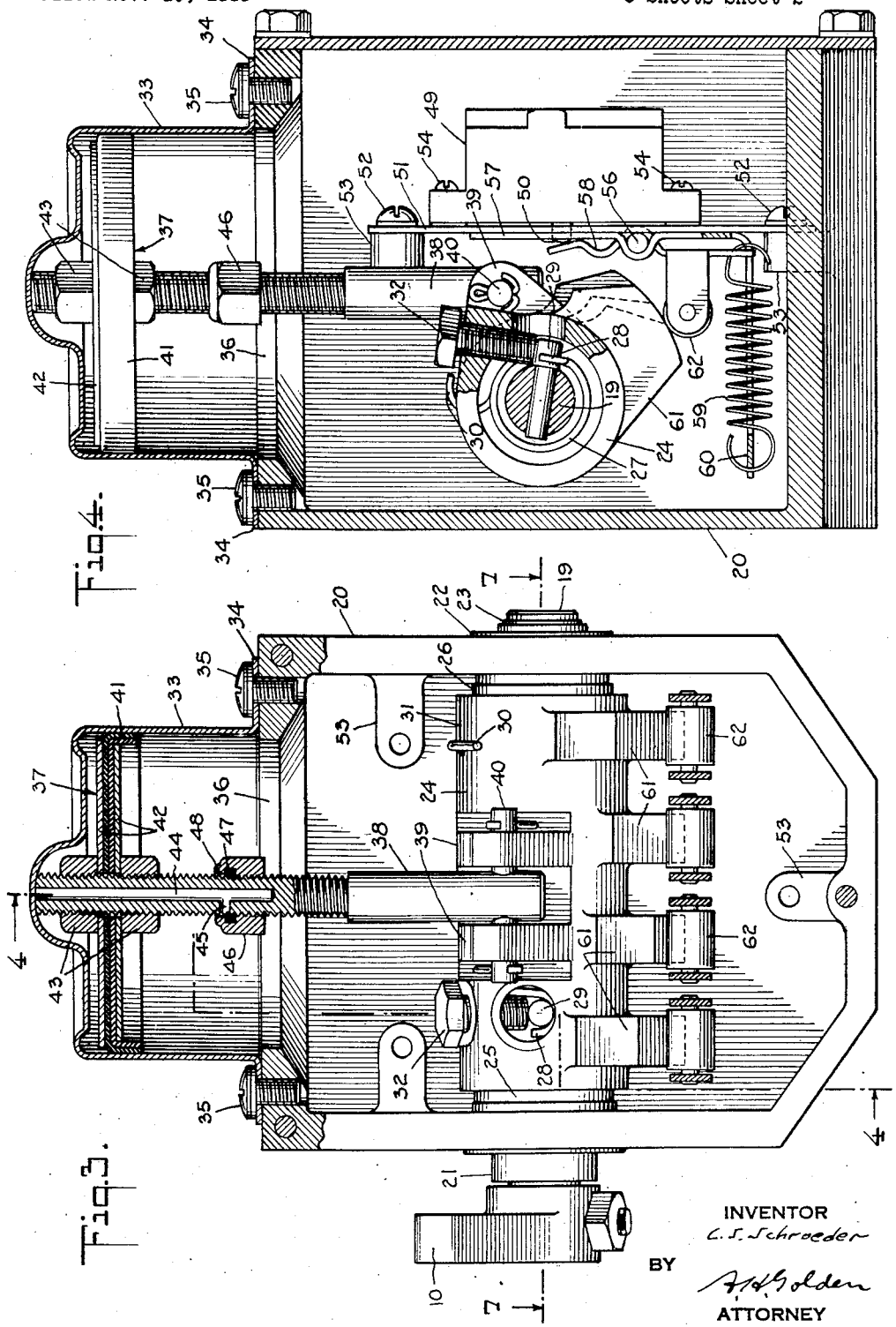
INVENTOR
C. S. Schroeder
BY
F. H. Golden
ATTORNEY March 4, 1958 C. S. SCHROEDER 2,825,771
TIME DELAYED CONTROLLER
Filed Nov. 19, 1953 3 Sheets-Sheet 3
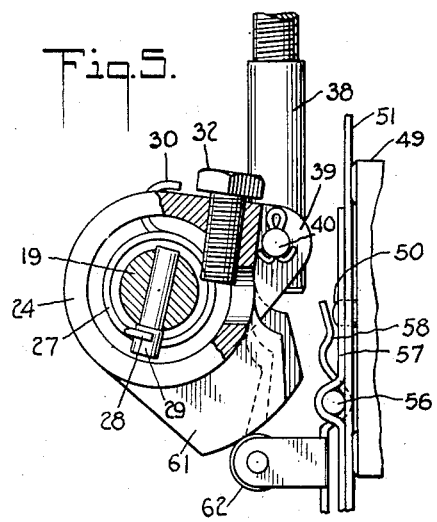
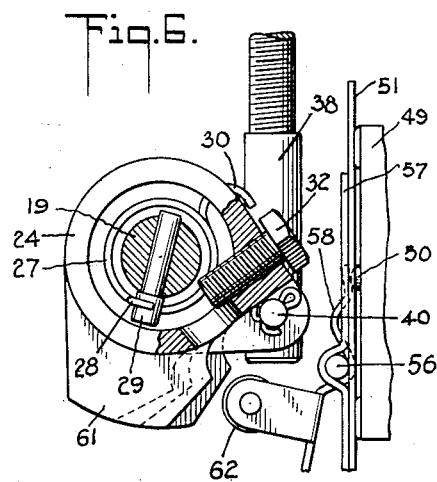
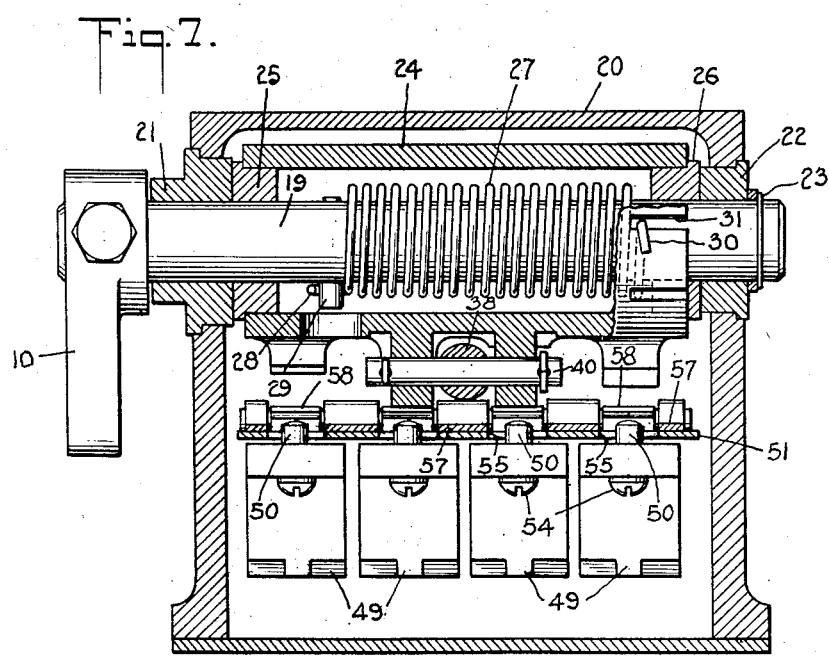
INVENTOR
C. S. Schroeder
BY
A. H. Golden
ATTORNEY

United States Patent Office 2,825,771
Patented Mar. 4, 1958

2,825,771

TIME DELAYED CONTROLLER

Charles S. Schroeder, Philadelphia, Pa., assignor to The Yale & Towne Manufacturing Company, Stamford, Conn., a corporation of Connecticut Application November 19, 1953, Serial No. 393,095

8 Claims. (Cl. 200—34)

This invention relates to motor speed controllers of the class having timing means that govern the advancing movement of the controller whereby the controller does not move through successive speed positions without some pause in each speed.

A controller of this class is shown in the patent to Bronislaus I. Ulinski, No. 2,632,819. In the Ulinski patent, a dashpot is utilized to control a rotating cam-carrying member that actuates a series of speed circuits. The controller has manual means for rotating the member, but these means act through the intermediary of a spring that yields when the manual means move to rotate the member faster than is permitted by the dashpot. With the cam-carrying member thus controlled by the dashpot, the energy stored in the spring is effective to rotate the member at a predetermined rate. The Ulinski controller may be returned positively to neutral at full manual speed when desired. The controller that I have now conceived utilizes the same operating principle as the Ulinski controller, but has an exceedingly novel structure that is a very considerable improvement over Ulinski because it is smaller and much less expensive to manufacture, and yet operates very efficiently and effectively.

As an important feature of my invention, I utilize for rotating the cam-carrying member a novel spring and spring mounting that occupy but little space in the controller. In the Ulinski patent to which I have referred, the spring is a tension spring attached between lever arms on the cam-carrying member and a manually rotated shaft. This arrangement necessitates placing the spring a substantial distance outwardly from the member and shaft. In my invention, I utilize a spring that is mounted in the axis of the rotating shaft, with the cam-carrying member preferably in telescoped relation to the shaft and spring so that the spring is actually within the member. As a more detailed feature, I prefer to utilize a coil spring encircling the manually rotated shaft, and so attached that it is wound when the shaft rotates relatively to the cam-carrying member.

As a further feature, I contribute novel and simple means for controlling and adjusting the action of the dashpot, these means being so constructed as to be normally inaccessible whereby to reduce the likelihood of tampering by unauthorized persons to change the speed at which the controller operates. More particularly, I mount the dashpot piston upon a rod actuated by the cam-carrying member, with the rod constructed to provide the fluid escape means for the dashpot. The valve for the escape means is actually an adjustable nut threaded upon the rod, and to obtain access to this nut, it is necessary first to open the controller housing.

As a further particular feature, I have conceived novel means through which the cam-carrying member acts to control the several speed circuits of the controller. In the Ulinski controller, the cams coact with switch levers that carry contact bars, with each lever adapted to move its bar directly against a pair of contacts. I am enabled by my invention to utilize, for controlling each circuit, a standard type of snap-action switch that is extremely compact. These switches have actuating buttons, and I provide a spring pressed lever to actuate each button, the levers being held against action by the springs through contact with the cams.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings:

Fig. 3 is a sectional view of the controller, taken on the line 3—3 in Fig. 2.

Fig. 4 is a sectional view on the line 4—4 of Fig. 3.

Figs. 5 and 6 are like a portion of Fig. 4, but illustrate the time controlled movement of the cam-carrying member.

Fig. 7 is a cross-sectional view on the line 7—7 of Fig. 3.

Figure 1:
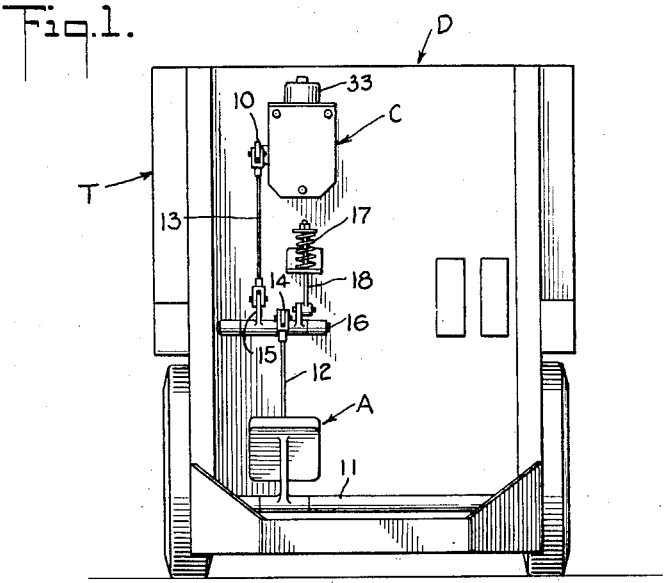
Fig. 1 shows my novel controller installed on an electric industrial truck.
Figure 2:
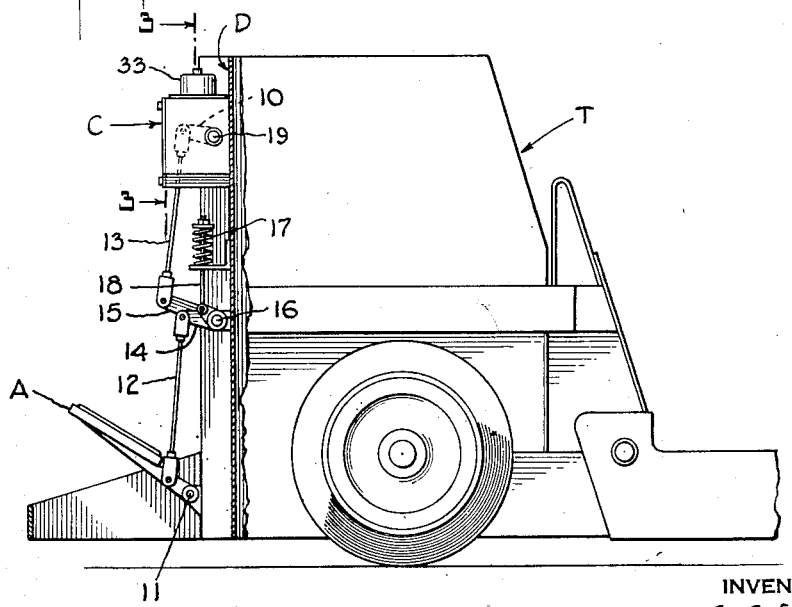
Fig. 2 is a side view of Fig. 1.

Referring more particularly to Figs. 1 and 2, I show my novel controller C mounted on the dash D of the truck T. The controller C has an operating lever 10, and to impart speed advancing movement to this lever, I show a conventional treadle A pivoted to the truck T through a shaft 11. The treadle A moves the operating lever 10 downwardly through links 12 and 13, these links being connected through levers 14, 15 that rotate together on a pivot 16 on the dash D. The upward return movement of the operating lever 10 is effected by a spring 17 acting on the levers 14, 15 through a rod 18. The spring 17 normally maintains the controller in neutral position, but yields when the operator moves the treadle A to start the truck T, as will be well understood by persons skilled in the art.

In my controller C, I utilize a rotating shaft 19 that extends transversely through the interior of the controller housing 20, as best seen in Fig. 7, with the operating lever 10 secured integrally to one end of the shaft outside the housing 20. Preferably, the sides of the housing 20 are equipped with bearing members 21, 22 in which the shaft 19 rotates, the lever 10 retaining the shaft at one end relative to these bearings, and a ring 23 positioned in a groove to retain the shaft at the opposed end. In telescoped relation to the shaft 19 within the housing 20, I provide a tubular cam-carrying member 24 having at least a portion that is sufficiently large in diameter to leave a space around the shaft 19, as clearly shown in Figs. 5 to 7. The member 24 is mounted to rotate relatively to the shaft 19 in the shaft axis, and for this purpose I show bushings 25, 26 positioned on the shaft in the opposed ends of the tubular member 24.

Referring again to Fig. 7, I show at 27 the spring through which the rotating shaft 19 in my novel construction imparts advancing movement to the controller. The spring 27 is a coil spring encircling the shaft 19 inside the member 24, with one hooked end 28 engaged with a transverse pin 29 on the shaft 19, and an opposed hooked end 30 engaged in a slot 31 in the cam-carrying member 24. Through this arrangement, the rotating shaft 19 can rotate the member 24 to effect successive speed positions of the controller, but with a yielding action that will be fully described in due course. It will be observed here that the spring 27, by its particular construction and mounting inside the telescoped member 24, enables the rotating shaft 19 to rotate the cam-carrying member 24 through yielding means that require almost no space in the controller.

To enable the shaft 19 to effect positive return movement of the cam-carrying member 24, I equip this member 24 with a screw 32, well shown in Figs. 3 to 6. The screw 32 is threaded inwardly through the side of the member 24 and is so positioned that its inner end can be contacted by the transverse pin 29 on the shaft 19. The return movement of the shaft 19 is in a counter-clockwise direction as viewed in Fig. 4, and during this movement the shaft 19 rotates the cam-carrying member 24 in a positive manner by direct engagement between the pin 29 and screw 32. I thereby contribute efficient means for the return movement of the controller, with these means as well as the advancing means occupying very little space in the controller.

For controlling the rotation of the cam-carrying member 24, my novel controller is equipped with a dashpot having a cylinder 33, shown in Figs. 3 and 4. I prefer to form the cylinder 33 merely as a cup-shaped sheet metal member, with a flange 34 through which it is mounted in position over an opening 36 in the top of the controller housing 20 by screws 35. A piston 37 in the cylinder 33 has a rod 38 extending downwardly through the opening 36 into the housing 20. The cam-carrying member 24 has at one side a pair of spaced lugs 39, and the lower end of the rod 38 is positioned between these lugs and pivoted thereto by a pin 40. This arrangement is such that the member 24, when advancing through successive speed positions, moves the piston 37 downwardly in the cylinder 33, thereby tending to create in the cylinder 33 a vacuum that opposes the movement of the member 24.

I show the piston 37 equipped with a flexible cup 41 arranged to maintain the vacuum in the cylinder, this cup being held between two discs 42 that are held in turn between two nuts 43 threaded on the upper end of the piston rod 38. It is important to realize that the piston rod 38 in this construction extends through the piston 37, but the details of the piston are not otherwise important to an understanding of my invention. It is conceivable, of course, that by rearranging certain parts of the controller, the dashpot could be arranged to control the movement of the tubular member 24 by compressing fluid in the cylinder 33, and I do not intend to limit my invention to the vacuum principle.

Referring to Fig. 3, I form the piston rod 38 with a longitudinal bore 44 extending downwardly from the extreme upper end of the rod above the piston 37. Below the piston, I form the rod 38 with a transverse opening 45 communicating with the bore 44 to provide a passage for the flow of fluid past the piston 37. To control this passage, I thread upon the rod 38 a nut 46 having a resilient insert 47, with a portion 48 of the nut bore somewhat enlarged at one side of this insert. By rotating the nut 46, the insert 47 can be positioned to close the opening 45 in the rod in varying degrees, thereby adjusting the rate at which fluid flows in the bore 44.

The nut 46, therefore, controls the downward movement of the piston 37 in the cylinder 33, and thereby controls the rate at which the tubular member 24 rotates to successive speed positions. When the operating shaft 19 of the controller tends to advance the member 24 too rapidly, the shaft 19 winds the spring 27, and the energy thus stored in this spring is effective thereafter to advance the controller at a predetermined rate that is controlled by the adjustment of the nut 46. The nut 46 is, of course, positioned inside the cylinder 33 and housing 20, and therefore is relatively inaccessible so that the predetermined advancing speed of the controller is not likely to be changed by tampering.

I shall now describe the means whereby the cam-carrying member 24 in my exceedingly novel and compact construction actuates the speed circuits of the controller. I utilize for this purpose a series of standard snap-action switches 49, Figs. 4 to 7, of the type having depressible actuating buttons 50. Of course, each switch 49 will be so selected as to have an arrangement of contacts suitable for the particular circuit. To mount the switches 49, I utilize a vertical plate 51, Fig. 4, positioned near one side of the cam-carrying member 24 and secured by screws 52 to lugs 53 on the controller housing 20.

The switches 49 are attached to the mounting plate 51 by screws 54, Figs. 4 and 7, with their buttons 50 positioned toward the cam-carrying member 24 in slots 55 of the plate 51, Fig. 7. I equip the plate 51 with a transverse pivot 56 below the switch buttons 50, this pivot 56 being mounted preferably through an angular bracket 57, Fig. 4, that is integrally attached to the plate 51. On the transverse pivot 56 is an actuating lever 58 for each switch 49, with the upper end of each lever adapted to move into a slot 55 to depress the button 50 of its particular switch.

The movement of each actuating lever 58 to depress its switch button 50 is effected by a coil spring 59, Fig. 4, attached between the lower end of the lever and a transverse part 60 on the angular bracket 57. For moving the levers 58 in the opposed direction to release the switch buttons 50, I form cams 61 on the cam-carrying member 24, these cams engaging the levers 58 preferably through rollers 62 on the levers. In the particular arrangement, the cams 61 hold the levers 58 away from the switch buttons 50 when the controller is in neutral position, as in Fig. 4. Advancing movement of the controller, on the other hand, causes the spring 59 actually to move the switch buttons 50 to depressed position, as shown in Fig. 6. Of course, the action of the spring 59 is timed because the dashpot controls the movement of the cam-carrying member 24. If the operating shaft 19 tends to rotate the member 24 too rapidly, this shaft merely winds the spring 27 as shown in Fig. 5, and this spring 27 thereafter rotates the member 24, as in Fig. 6, to enable the spring 59 to depress the buttons 50.

I now believe it to be clear that my novel construction not only enables me to utilize standard snap-action switches in a very efficient arrangement in the controller, but enables me also to obtain timed action of these switches through structure that occupies extremely little space. I accomplish this, moreover, through structure that is relatively inexpensive to manufacture and yet well adapted to perform satisfactorily over a period of time without maintenance. Those skilled in the art will appreciate, therefore, the very considerable value of my contribution.

I now claim:

1. In a controller of the class described, a rotating shaft for operating the controller, a spring wound by rotation of the shaft in one direction, a sleeve-like member in telescoped relation to said shaft, bearings mounting said member to rotate about said shaft, timing means for controlling the speed at which said member rotates, a series of switch actuating cams on the outer surface of said sleeve-like member, and means through which said spring when wound by the shaft rotates said member whereby to move the cams under the control of said timing means.

2. In a controller of the class described, a rotating shaft for operating said controller, a sleeve-like member positioned in telescoped relation about said shaft and mounted to rotate relatively thereto, a series of switch actuating cams on the outer periphery of said sleeve-like member in predetermined angular relation to one another, a coil spring encircling said rotating shaft and secured between said shaft and member whereby the shaft by its rotation actuates said spring to move the member and the switch actuating cams yieldingly through said spring in one direction, and means through which said shaft coacts positively with the said member to move the said member and cams positively in an opposed direction.

3. In a controller of the class described, a rotating shaft for operating said controller, a spring wound by rotation of the shaft in one direction, a sleeve-like member positioned in telescoped relation about said shaft and spring and mounted to rotate relatively to the shaft, a series of switch actuating cams on the outer surface of said sleeve-like member in predetermined angular relation to one another, means securing said spring to said sleeve-like member whereby the spring when wound by the shaft yieldingly effects rotation of said sleeve-like member and cams, and means through which said shaft coacts positively with the said member for moving the said member and cams positively in an opposed direction.

4. In a controller of the class described, a rotating shaft for operating said controller, a sleeve-like member positioned in telescoped relation about said shaft and mounted to rotate relatively thereto, a series of switch actuating cams on the outer periphery of said sleeve-like member in predetermined angular relation to one another, a coil spring encircling said rotating shaft and secured between said shaft and member whereby the rotation of said shaft yieldingly effects rotation of said sleeve-like members and cams through said spring, and timing means comprising a part also secured to the outer periphery of said sleeve-like member and coacting with said member to control the speed of movement of the switch actuating cams to close a series of circuits.

5. In a controller of the class described, a rotating shaft for operating the controller, a member mounted for rotation relatively to the shaft, a series of switch actuating cams rotating with said member, a spring through which the shaft rotates said member to move the switch actuating cams in one direction, a dashpot cylinder, a piston in said cylinder, a rod on said piston, means through which said member is attached to one end of said rod for actuating the piston, a passage in said rod for the flow of fluid relatively to opposed sides of the piston, and a nut on said rod at one end of said passage for controlling fluid flow in the passage whereby to control the speed at which said spring moves the switch actuating cams in the said one direction.

6. In a controller of the class described, a rotating shaft for operating the controller, a member mounted for rotation relatively to the shaft, a series of switch actuating cams rotating with said member, a spring through which the shaft rotates said member to move the switch actuating cams in one direction, a dashpot cylinder, a piston in said cylinder, a rod on said piston, a pivot through which the said member is attached to one end of the rod for actuating the piston, a bore drilled longitudinally through a part of said rod with openings at opposed sides of the piston, a nut threaded on said rod in juxtaposition to one of said openings, and a part of said nut controlling fluid flow through said bore whereby to control the speed at which the spring moves the switch actuating cams in the said one direction.

7. In a controller of the class described, a rotating shaft for operating said controller, a coil spring encircling said rotating shaft, a sleeve-like member in telescoped relation to said shaft and spring, bearings mounting said sleeve like member to rotate about the shaft, a series of switch actuating cams on the outer surface of said sleeve-like member, means securing said coil spring between said shaft and member whereby the shaft is effective to rotate the sleeve-like member and the cams in one direction, a pin rotating with said shaft, a screw on said sleeve-like member adapted to be engaged by said pin to rotate the member and the cams positively in a direction opposed to said one direction, and said screw when rotated relatively to said member effecting adjustment between the sleeve-like member and shaft.

8. In a controller of the class described, a rotating shaft for operating the controller, a sleeve-like member mounted about the shaft and having upon its outer surface a series of longitudinally spaced cams, a spring through which the shaft rotates said sleeve-like member and cams in one direction, positive means through which the shaft rotates said member in an opposed direction, a series of snap-action switches having buttons positioned in longitudinal alignment with said cams, a lever for each switch, a series of springs pressing the levers toward said buttons for depressing said buttons and actuating said switches, and said cams moving said levers against the pressure of said springs whereby to effect actuation of the switches in an opposed direction.

References Cited in the file of this patent
UNITED STATES PATENTS

| | | |
|---|---|---|
| 872,991 | Crocker | Dec. 3, 1907 |
| 1,162,056 | Harris | Nov. 30, 1915 |
| 1,296,693 | Pentecost | Mar. 11, 1919 |
| 2,207,189 | Austin et al. | July 9, 1940 |
| 2,318,281 | Bird | May 4, 1943 |
| 2,379,704 | Goff | July 3, 1945 |
| 2,468,974 | Hammer | May 3, 1949 |
| 2,632,819 | Ulinski | Mar. 24, 1953 |
| 2,670,411 | Dawe et al. | Feb. 23, 1954 |